US009756975B1

(12) United States Patent
Atilla

(10) Patent No.: US 9,756,975 B1
(45) Date of Patent: Sep. 12, 2017

(54) FULL AUTOMATIC TURKISH COFFEE COOKING AND SERVING MACHINE

(71) Applicant: Arzum Elektrikli Ev Aletleri San. Ve Tic. A.S., Istanbul (TR)

(72) Inventor: Ersoy Atilla, Istanbul (TR)

(73) Assignee: Arsum Elektrikli Ev Aletleri San Ve Tic. A.S., Istanbul (TR)

( * ) Notice: Subject to any disclaimer, the term of this patent is extended or adjusted under 35 U.S.C. 154(b) by 0 days.

(21) Appl. No.: 15/592,146

(22) Filed: May 10, 2017

Related U.S. Application Data

(62) Division of application No. 14/383,927, filed on Sep. 9, 2014, now Pat. No. 9,681,772.

(51) Int. Cl.
*A47J 31/36* (2006.01)
*A47J 31/18* (2006.01)
*A23F 5/26* (2006.01)

(52) U.S. Cl.
CPC .............. *A47J 31/36* (2013.01); *A23F 5/265* (2013.01); *A23F 5/267* (2013.01); *A47J 31/18* (2013.01)

(58) Field of Classification Search
CPC . A47J 31/18; A47J 31/36; A23F 5/265; A23F 5/267
See application file for complete search history.

(56) References Cited

U.S. PATENT DOCUMENTS

| 1,822,238 | A | * | 9/1931 | Sacco Albanese ... | A47J 31/043 99/292 |
| 2,814,245 | A | * | 11/1957 | Courtney ................ | A47J 31/20 99/300 |
| 5,406,882 | A | * | 4/1995 | Shaanan ................ | A47J 31/18 99/287 |

FOREIGN PATENT DOCUMENTS

| DE | 10034720 | * | 6/2001 |
| WO | WO2007077106 | * | 7/2007 |
| WO | WO2008052946 | * | 5/2008 |

OTHER PUBLICATIONS

English Translation DE10034720 published Jun. 2001.*

* cited by examiner

Primary Examiner — Anthony Weier
(74) Attorney, Agent, or Firm — Inventa Capital PLC

(57) ABSTRACT

The present invention relates to a Turkish coffee cooking and serving machine having a cooking compartment whose inner volume is heated by a heater and wherein coffee mixture including Turkish coffee, water and optionally sugar is cooked; and when the cooking process is completed, providing transfer of the cooked coffee mixture in the cooking compartment through a discharge spout to a beverage receptacle for serving the cooked coffee to people.

12 Claims, 11 Drawing Sheets

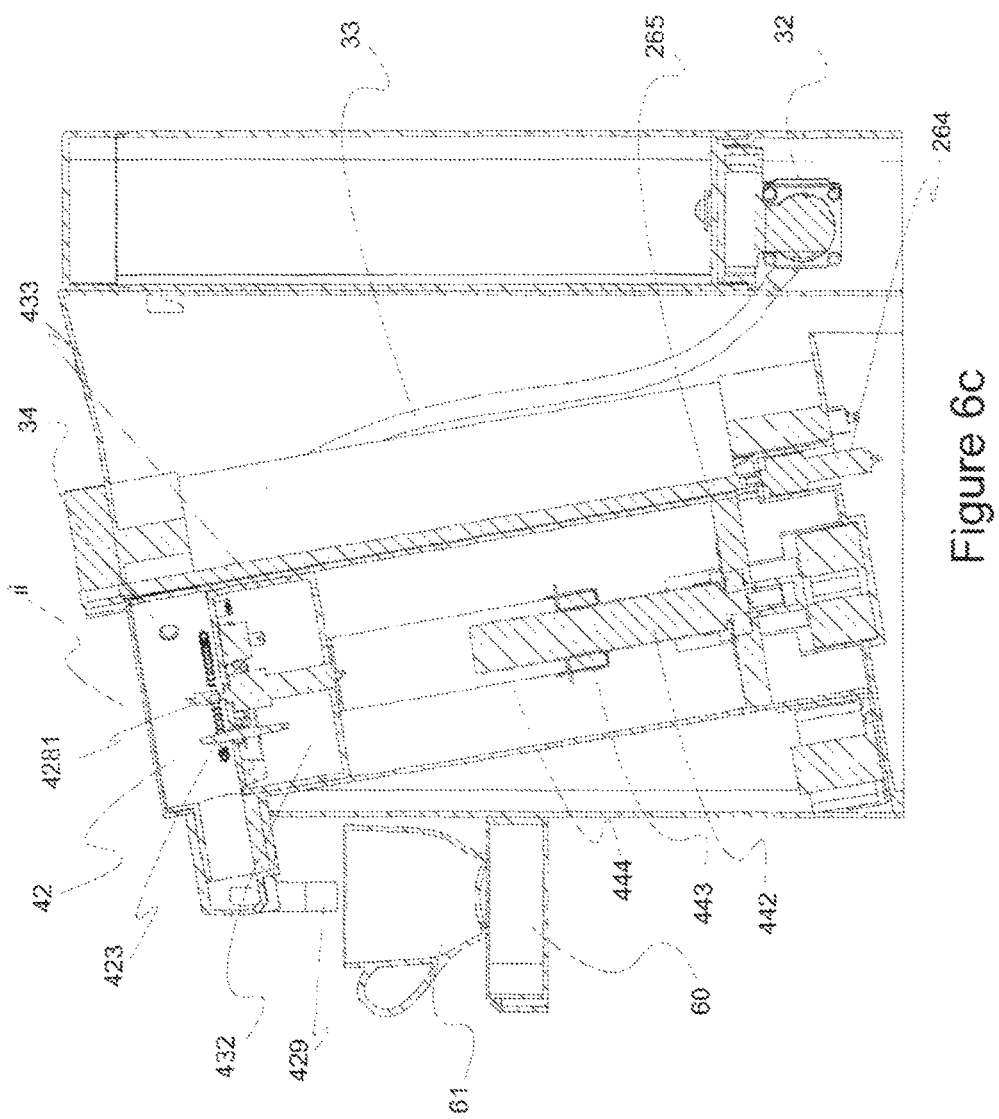

FULL AUTOMATIC TURKISH COFFEE COOKING AND SERVING MACHINE

RELATED APPLICATIONS

This application is a divisional application of U.S. application Ser. No. 14/383,927 filed on Sep. 9, 2014, now U.S. Pat. No. 9,681,772 which claims priority to International Application No. PCT/EP2013/055749, filed on Mar. 20, 2013 and incorporated herewith by reference in its entirety.

TECHNICAL FIELD

The present invention relates to a Turkish coffee cooking and serving machine whose inner side is heated by a heater and having a cooking compartment wherein Turkish coffee, water and optionally sugar are cooked and providing transfer of the cooked coffee to the beverage receptacle through the discharge spout in order to serve the cooked coffee.

PRIOR ART

Today, Turkish coffee is cooked manually or by means of pluralities of methods in an automatic manner. The most important criteria in making Turkish coffee is to adjust sugar and Turkish coffee proportions and to adjust the foam of the coffee and to transfer the foam of the coffee to the beverage receptacle completely and to prevent overflows. Automatic Turkish coffee machines in the present art provide a partial solution for the time problem and the coffee-sugar proportion adjustment problem.

The invention, described in the patent application EP2077742, relates to a coffee machine comprising a cooking pot used particularly for preparing Turkish coffee, contacting the ceiling of the cooking chamber by being placed in the cooking chamber, provided with a good leak-proofing with the ceiling of the cooking chamber and itself by means of the appropriate design of the pouring spout, whereby the liquid drops are prevented from running down the body surface after the pouring process.

The invention, described in the patent application 2011/09954, relates to a Turkish coffee machine comprising at least one heater cooking the materials, provided in said beverage receptacle, where the beverage receptacle is utilized as an external cooking compartment without an inner cooking compartment; a mixing unit mixing the materials inside the beverage receptacle by means of the drive received from the mixing motor and distributing the heat, received from said heater, to the whole of the receptacle in a homogeneous manner; and a movable mechanism said heater and mixing unit are connected thereto and which is movable linearly downwardly-upwardly by means of the drive received from at least one motor and providing the mixing unit and of the heater to enter into the beverage receptacle and to exit the beverage receptacle.

The invention, described in the patent application 2009/05555, relates to a Turkish coffee machine comprising a cooking compartment, water depot, water hose, water pump, steam boiler, level sensor and a cup compartment.

BRIEF DESCRIPTION OF THE INVENTION

The present invention relates to a novel Turkish coffee cooking and serving machine, in order to eliminate the abovementioned problems and to bring new advantages to the related technical field.

The main object of the present invention is to provide a Turkish coffee cooking and serving machine providing transfer of the foam of the coffee to the cup completely and prevent overflows and where the cooking compartment is cleaned in an automatic manner.

Another object of the present invention is to provide a Turkish coffee cooking and serving machine adjusting Turkish coffee and sugar proportion in an automatic manner.

In order to realize all of the abovementioned objects and the objects which are to be deducted from the detailed description below, the present invention is a Turkish coffee cooking and serving machine having a cooking compartment whose inner volume is heated by a heater and wherein coffee mixture including Turkish coffee, water and optionally sugar is cooked; and when the cooking process is completed, providing transfer of the cooked coffee mixture in the cooking compartment through a discharge spout to a beverage receptacle for serving the cooked coffee to people. As an improvement, said Turkish coffee cooking and serving machine comprises a pushing head moving vertically between a cooking position (i) and a discharge position (ii) where the coffee mixture in the cooking compartment is raised to the same level as the discharge spout, and defining the base of the cooking compartment; a drive mechanism moving said pushing head between cooking and discharging positions (i, ii); and a control unit controlling said drive mechanism.

In a preferred embodiment of the subject matter invention, the drive mechanism comprises a drive motor for providing the movement of the pushing head; and a movement transfer piece configured such that the movement applied by the drive motor is transferred to the pushing head.

In another preferred embodiment of the subject matter invention, there is a circularly moving screwed shaft receiving the movement provided by the drive motor for transferring said movement to the movement transfer piece; and a nut moving on the screwed shaft and transforming the circular movement of the screwed shaft to linear movement.

In another preferred embodiment of the subject matter invention, a nut holder part providing placement of the movement transfer piece into the nut; a shaft opening configured such that the screwed shaft will pass through on the upper part of the nut holder; and at least one lateral plate connected to the pushing head.

In another preferred embodiment of the subject matter invention, there is a main compartment separated into two compartments by the pushing head, where said compartments are called cooking compartment and drive mechanism compartment.

In another preferred embodiment of the subject matter invention, the drive mechanism comprises a top level sensor sensing that the cooking compartment arrives at the top position inside the main compartment; a bottom level sensor sensing that the cooking compartment is ready for receiving Turkish coffee, water and optionally sugar; and a piston level arm moving together with the movement transfer piece between the sensors so as to contact the sensors.

In another preferred embodiment of the subject matter invention, the pushing head is inclined such that the coffee mixture is poured to the beverage receptacle with the help of gravitational force.

In another preferred embodiment of the subject matter invention, there is an inclined base plate whereon the main compartment is positioned such that the pushing head is inclined.

In another preferred embodiment of the subject matter invention, the pushing head comprises a cylindrical body whose upper side of open and having an inner gap; and a top cover covering the upper surface of said cylindrical body and whereon the heater is provided and having a thermally conductive structure.

In another preferred embodiment of the subject matter invention, the pushing head comprises at least one gasket for providing sealing between the drive mechanism compartment and the cooking compartment.

In another preferred embodiment of the subject matter invention, the main compartment has a mixing unit provided on the pushing head for providing homogeneous cooking of the coffee mixture; and a mixing motor providing the movement of the mixing unit.

In another preferred embodiment of the subject matter invention, the mixing unit comprises at least one mixing arm connected to the motor shaft of the mixing motor, in order to mix the coffee mixture in the cooking compartment.

In another preferred embodiment of the subject matter invention, the mixing unit comprises an annular piece provided on the part of the top cover facing the cooking compartment; and a spring disposed onto said annular piece.

In another preferred embodiment of the subject matter invention, there is a temperature detector provided on the top cover so as to extend towards the cooking compartment, in order to stop the mixing motor when the coffee mixture reaches a predetermined temperature.

In another preferred embodiment of the subject matter invention, a bi-metal thermic unit is provided at the vicinity of the heater facing the inner gap of the top cover, in order to protect the heater from overheating.

In another preferred embodiment of the subject matter invention, the mixing motor is assembled to the top cover such that the mixing motor is extending in the inner gap of the pushing head.

In another preferred embodiment of the subject matter invention, there is a sugar dosing compartment wherein the sugar to be transferred to the cooking compartment is stored and adjusting the amount of sugar; a sugar pushing head which is vertically movable defining the base of the sugar dosing compartment; a drive mechanism moving the sugar pushing head in the vertical direction.

In another preferred embodiment of the subject matter invention, the drive mechanism comprises a drive motor for providing the movement of the sugar pushing head; a screwed shaft receiving the movement provided by the drive motor; a nut moving on the screwed shaft and transforming the circular movement of the screwed shaft to linear movement; and a movement transfer piece configured so as to transfer the vertical movement of the nut to the sugar pushing head.

In another preferred embodiment of the subject matter invention, the movement transfer piece comprises a nut holder part wherein the nut is placed; a shaft opening provided on the upper part of the nut holder and configured such that the screwed shaft will pass through; and at least one lateral plate connected to the sugar pushing head.

In another preferred embodiment of the subject matter invention, the drive mechanism comprises a top level sensor sensing that the sugar in the sugar dosing compartment is completely finished; a bottom level sensor sensing that the sugar dosing compartment is in a condition where sugar can be put; and a piston level arm moving together with the movement transfer piece between the sensors so as to contact the sensors.

In another preferred embodiment of the subject matter invention, there is a coffee dosing compartment wherein the Turkish coffee, to be transferred to the cooking compartment, is stored and where the amount of said Turkish coffee is adjusted; a vertically moving coffee pushing head defining the base of the coffee dosing compartment; a drive mechanism moving the coffee pushing head vertically.

In another preferred embodiment of the subject matter invention, the drive mechanism comprises a drive motor for providing the movement of the coffee pushing head; a screwed shaft receiving the movement provided by the drive motor; a nut moving on the screwed shaft and transforming the circular movement of the screwed shaft to linear movement; and a movement transfer piece configured so as to transfer the vertical movement of the nut to the coffee pushing head.

In another preferred embodiment of the subject matter invention, the movement transfer piece comprises a nut holder part wherein the nut is placed; a shaft opening provided on the upper part of the nut holder and configured such that the screwed shaft will pass through; and at least one lateral plate connected to the coffee pushing head.

In another preferred embodiment of the subject matter invention, the drive mechanism comprises a top level sensor sensing that the coffee in the coffee dosing compartment is completely finished; a bottom level sensor sensing that the coffee dosing compartment is in a condition where coffee can be put; and a piston level arm moving together with the movement transfer piece between the sensors so as to contact the sensors.

In another preferred embodiment of the subject matter invention, there is a dosing piece assembled to the upper part of the dosing compartments so as to rotate around an assembly axis (a) and rotating in direction A and transferring the sugar raised to the own alignment by the sugar pushing head in the sugar dosing compartment and rotating in direction B which is opposite to direction A and transferring the Turkish coffee, raised to the own alignment by the coffee pushing head in the coffee dosing compartment, to the cooking compartment; and a transfer drive motor connected to the dosing piece so as to provide rotation movement in said two directions (A, B).

In another preferred embodiment of the subject matter invention, the dosing piece comprises a sugar division facing the outlet of the sugar dosing compartment and wherein the sugar to be transferred to the cooking compartment is accumulated; and a coffee division facing the outlet of the coffee dosing compartment and wherein the Turkish coffee to be transferred to the cooking compartment is accumulated.

In another preferred embodiment of the subject matter invention, there is a water depot where water is stored in order to be transferred to the cooking compartment; at least one water pipe provided between the water depot and the cooking compartment; a water outlet providing discharge of water from the water pipe to the cooking compartment; and a water pump pumping water from the water depot to the water pipe.

In another preferred embodiment of the subject matter invention, there is a cleaning button utilized for starting the cleaning process by means of the water transferred from the water depot of the cooking compartment; a sugar adjustment button provided at a vicinity of the cleaning button and providing sugar proportion selection; at least one cup button providing determination of the number of beverage receptacles the Turkish coffee will be served thereto; and an LCD screen displaying the adjustments.

In another preferred embodiment of the subject matter invention, in order to adjust the cooking temperature of the coffee mixture, the control unit is configured such that the temperatures, adjusted according to the predetermined parameters, will be displayed on the LCD screen in case the cleaning button is pressed for certain time duration.

In another preferred embodiment of the subject matter invention, the cup buttons are configured such that the cooking temperature can be increased and decreased according to predetermined parameters.

In another preferred embodiment of the subject matter invention, the beverage receptacle is a cup.

The present invention is a Turkish coffee cooking and serving method where the inner side is heated by a heater and having a cooking compartment wherein Turkish coffee, water and optionally sugar are cooked and providing transfer of the cooked coffee in the cooking compartment to the beverage receptacle through the discharge spout in order to serve the cooked coffee. As an improvement, the present method is characterized by comprising the steps of:
 a) providing a coffee mixture comprising Turkish coffee, water and optionally sugar in the cooking compartment which is in cooking position (i),
 b) heating the coffee mixture up to a predetermined temperature and thus cooking the coffee mixture,
 c) mixing the coffee mixture by a mixing unit for a certain duration in the cooking compartment during the cooking process,
 d) raising the coffee mixture up to the discharge spout when the predetermined temperature is reached and taking the coffee mixture to a discharge position (ii) and thus transferring the coffee mixture to the beverage receptacle.

In another preferred embodiment of the subject matter invention, step (a) comprises the sub-steps of:
 i) putting sugar to a sugar dosing compartment,
 ii) transferring predetermined amount of sugar to a sugar division as a sugar pushing head is moving upwardly,
 iii) rotating the sugar division around an assembly axis (a) and transferring the sugar in the sugar division to a cooking compartment,
 iv) placing Turkish coffee to a coffee dosing compartment,
 v) transferring predetermined amount of Turkish coffee to a coffee division as a coffee pushing head is moving upwardly,
 vi) rotating the coffee division around an assembly axis (a) and transferring the Turkish coffee in the coffee division to a cooking compartment,
 vii) transferring the water in a water depot to the cooking compartment by means of a water pump.

In another preferred embodiment of the subject matter invention, in said step (a), Turkish coffee and optionally sugar are added to the cooking compartment manually, and water is transferred to the cooking compartment by means of the water pump from the water depot.

In another preferred embodiment of the subject matter invention, step (b) comprises the sub-steps of:
 i) pressing the cleaning button on a key pad for certain duration and displaying the temperatures adjusted according to the predetermined parameters on the LCD screen,
 ii) determining the cooking temperature by utilizing the single cup button and the double cup button,
 iii) cooking the coffee mixture by the heat received by the heater,
 iv) control of the coffee mixture up to the cooking temperature by measuring the temperature of the temperature detector,
 v) stopping the operation of the heater by a bi-metal thermic unit in case the heater is overheated.

In another preferred embodiment of the subject matter invention, in said step (c), the coffee mixture is mixed by a mixing arm rotating as a result of the drive of the mixing motor around an axis defining the center of the base of the cooking compartment.

In another preferred embodiment of the subject matter invention, step (d) comprises the sub-steps of:
 i) raising the coffee mixture from the cooking position (i) to the discharge position (ii) as a pushing head defining the base of the cooking compartment is moving upwardly,
 ii) discharging the coffee mixture to the beverage receptacle by the discharge spout.

In another preferred embodiment of the subject matter invention, in said step (ii), a main compartment wherein the pushing head is provided is positioned on an inclined base plate; and the pushing head obtains an inclination so as to facilitate the discharge of the coffee mixture to the beverage receptacle by means of gravitational force.

BRIEF DESCRIPTION OF THE FIGURES

In FIGS. 6b and 6c, a cross sectional view of the cooking and serving system of the subject matter Turkish coffee cooking and serving machine is given.

REFERENCE NUMBERS

Figure 1:
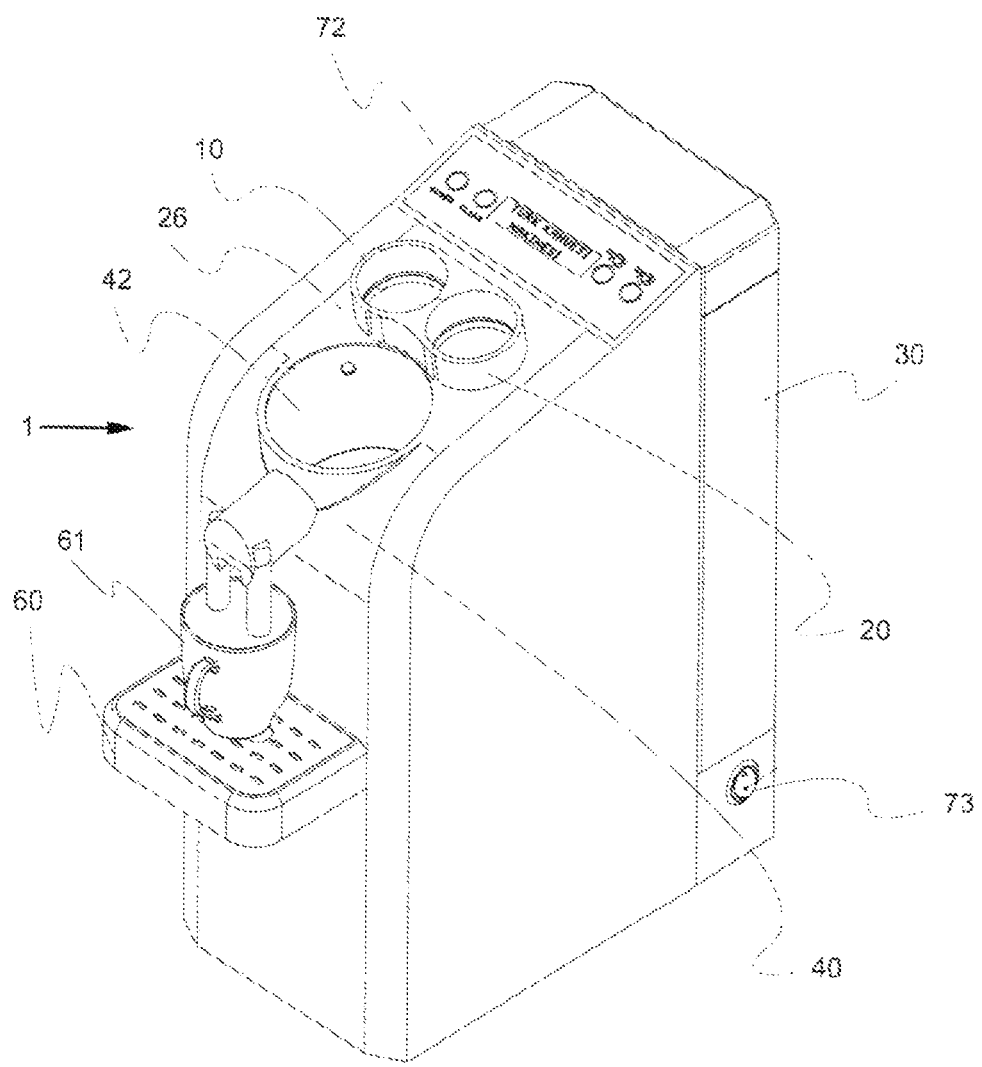
In FIG. 1, the general representative view of the subject matter Turkish coffee cooking and serving machine is given.

1 Main casing
10 Sugar dosing system
11 Main compartment
12 Sugar dosing compartment
121 Outlet
13 Sugar pushing head
14 Drive mechanism compartment
141 Drive mechanism
142 Drive motor
143 Screwed shaft
144 Nut
145 Movement transfer piece
146 Nut holder 147 Shaft opening
148 Lateral plate
149 Piston level arm
150 Top level sensor
151 Bottom level sensor
20 Coffee dosing system
21 Main compartment
22 Coffee dosing compartment
221 Outlet
23 Coffee pushing head
24 Drive mechanism compartment
241 Drive mechanism
242 Drive motor
243 Screwed shaft
244 Nut
245 Movement transfer piece
246 Nut holder
247 Shaft opening
248 Lateral plate
249 Piston level arm
250 Top level sensor
251 Bottom level sensor
26 Transfer system
261 Dosing piece
262 Sugar division
263 Coffee division
264 Transfer drive motor
265 Transfer drive shaft
30 Water transfer system
31 Water depot
32 Water pump
33 Water pipe
34 Water outlet
40 Cooking and serving system
41 Main compartment
42 Cooking compartment
421 Heater
422 Bi-metal thermic unit
423 Temperature detector
424 Mixing unit
425 Mixing arm
426 Spring
427 Annular piece
428 Mixing unit motor
4281 Motor shaft
429 Discharge spout
43 Pushing head
431 Gasket
432 Inner gap
433 Cylindrical body
4331 Gasket housing
434 Top cover
44 Drive mechanism compartment
441 Drive mechanism
442 Screwed shaft
443 Nut
444 Movement transfer piece
445 Nut holder
446 Shaft opening
447 Lateral plate
448 Piston level arm
449 Top level sensor
450 Bottom level sensor
451 Drive motor
60 Service base
61 Beverage receptacle
70 Control system 71 Control unit
72 Key pad
721 LCD screen
722 Sugar adjustment button
723 Single cup button
724 Double cup button
725 Cleaning button
73 Turn on-turn off button
80 Base plate
a Assembly axis
i Cooking position
ii Discharge position

THE DETAILED DESCRIPTION OF THE INVENTION

In this detailed description, the subject matter improvement is explained with references to examples without forming any restrictive effect in order to make the subject more understandable.

Figure 2A:
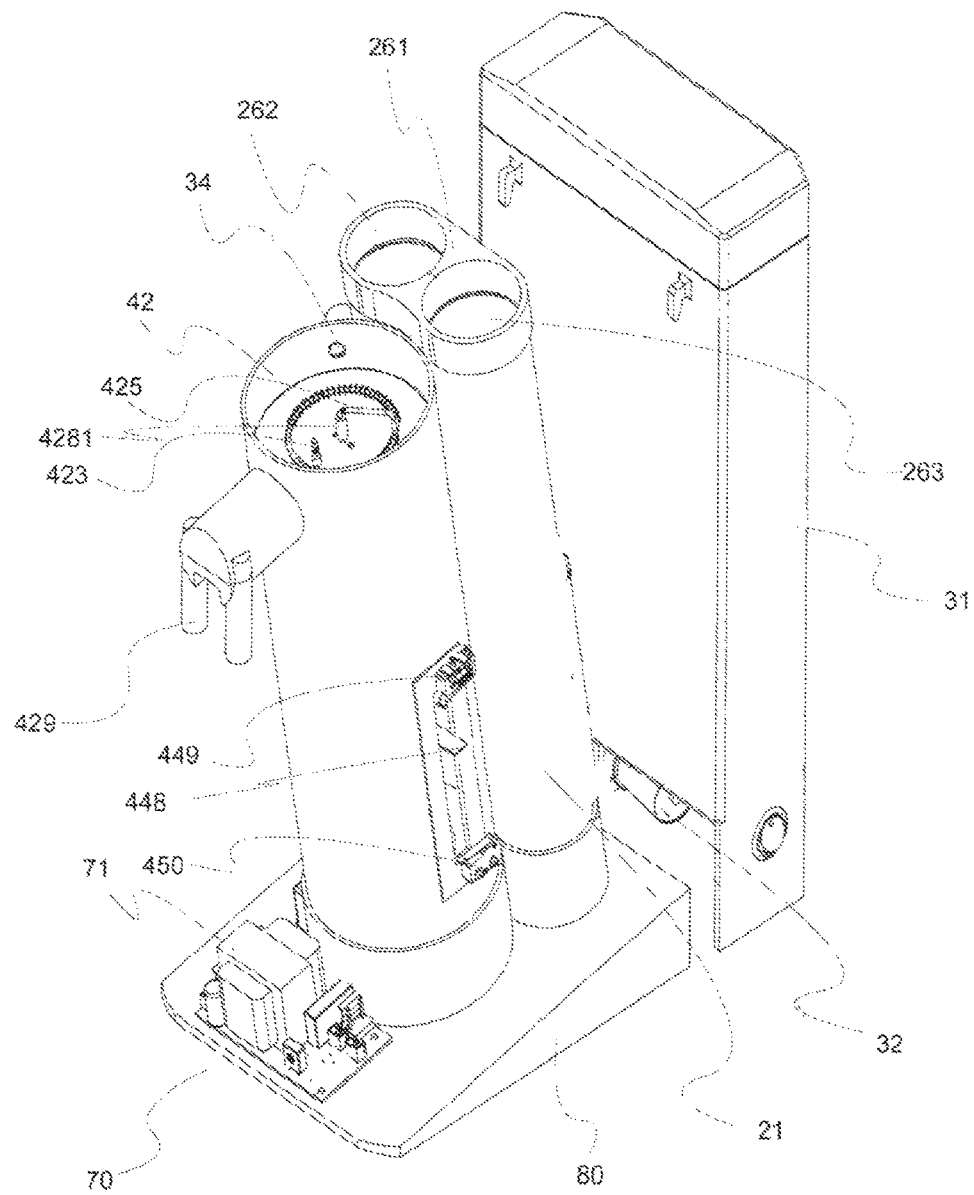
In FIG. 2a, the perspective representative view of the inner part of the subject matter Turkish coffee cooking and serving machine is given from one side.
Figure 2B:
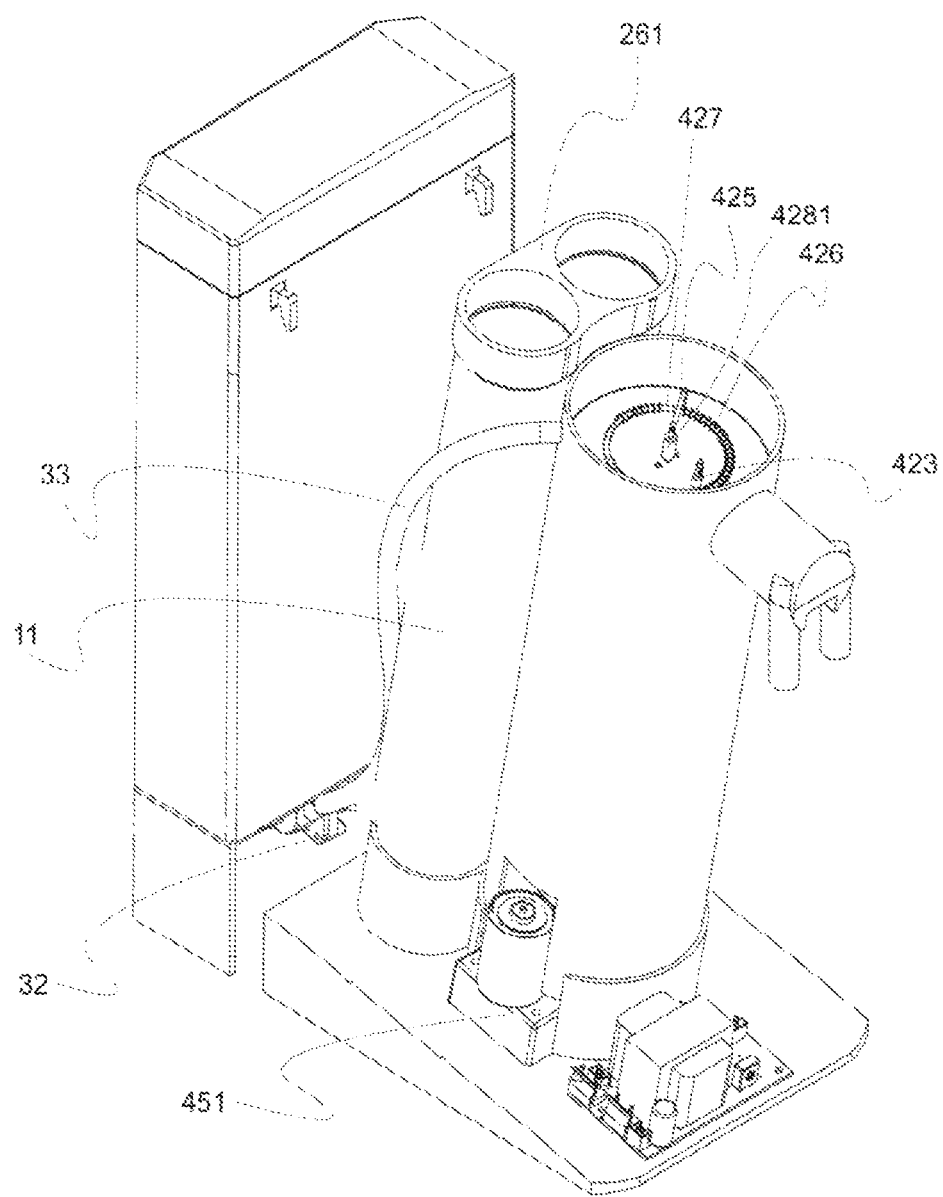
In FIG. 2b, the perspective representative view of the inner part of the subject matter Turkish coffee cooking and serving machine is given from the other side.

With reference to FIGS. 1, 2a and 2b, the Turkish coffee cooking and serving machine comprises a sugar dosing system (10) wherein sugar is stored for being transferred to a cooking compartment (42) and prepared for transfer according to a predetermined amount; a coffee dosing system (20) wherein Turkish coffee is stored for being transferred to a cooking compartment (42) and prepared for transfer according to a predetermined amount; a transfer system (26) providing transfer of the sugar and Turkish coffee to the cooking compartment (42); a water transfer system (30) providing adding of the water to the cooking compartment (42); a cooking and serving system (40) providing cooking of the Turkish coffee and providing transfer thereof to a beverage receptacle (61); and a control system (70) controlling the systems (10, 20, 26, 30, 40). The systems (10, 20, 26, 30, 40) are placed into a main casing (1). A service base (60) is positioned on the front side of the main casing (1) and a beverage receptacle (61) is positioned on the service base (60). In the preferred application, cup is used as the beverage receptacle (61).

Figure 3:
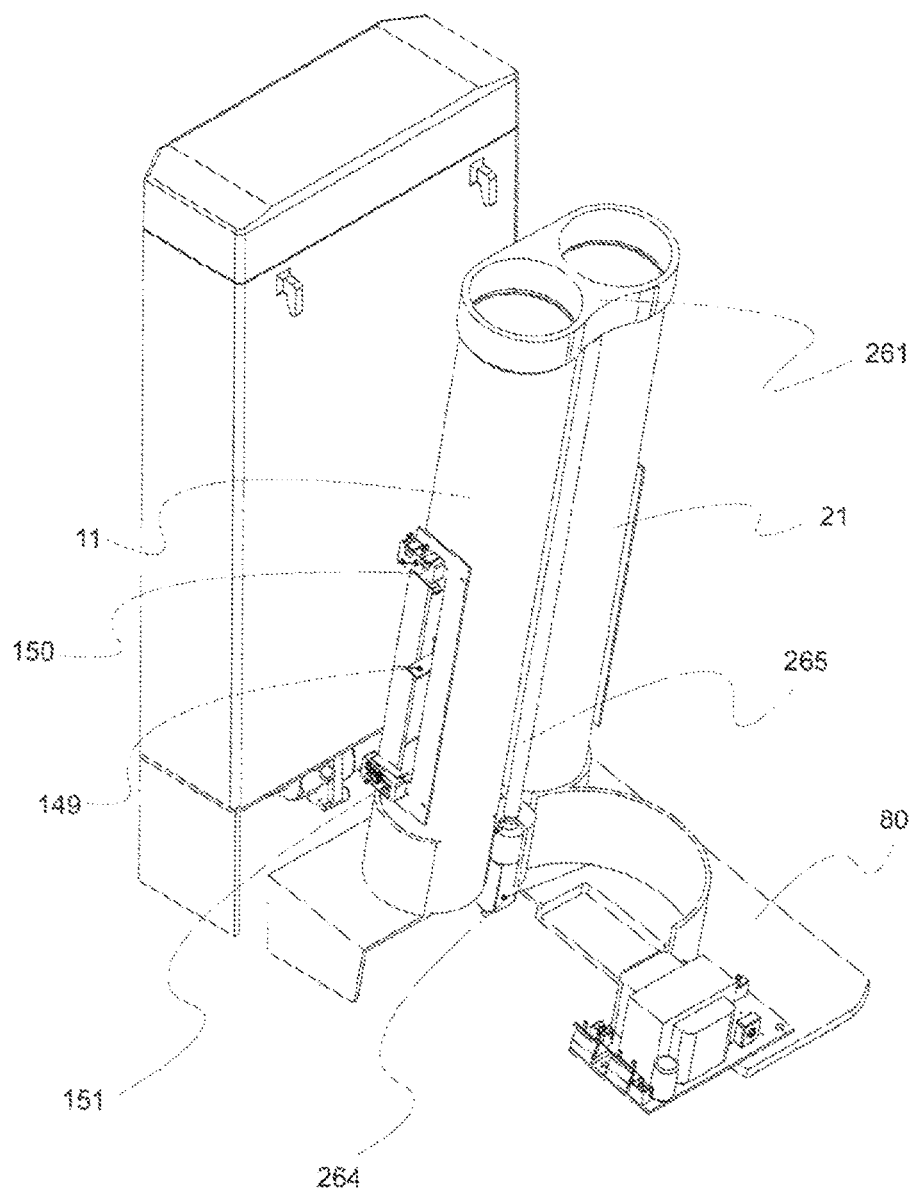
In FIG. 3, the perspective view of the sugar transferring and coffee dosing system of the subject matter Turkish coffee cooking and serving machine is given.
Figure 4:
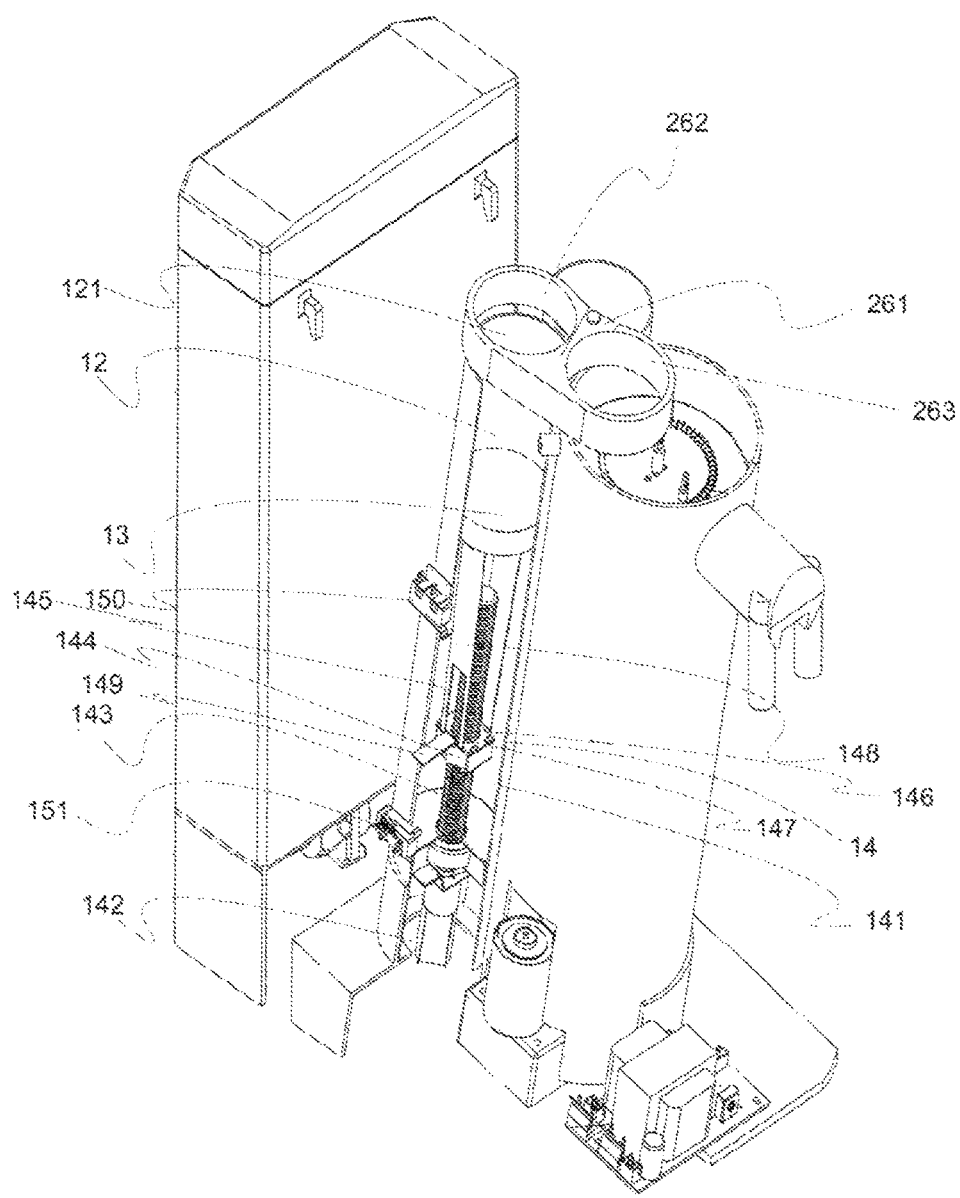
In FIG. 4, a perspective view of the application of the sugar dosing system of the subject matter Turkish coffee cooking and serving machine is given.

With reference to FIGS. 3 and 4, in the sugar dosing system (10); there is a sugar dosing compartment (12) providing sugar amount adjustment inside the main compartment (11); a drive mechanism compartment (14) wherein the drive mechanism (141) is existing providing adjustment of the sugar amount inside said sugar dosing compartment (12); and there is a sugar pushing head (13) between the compartments (12, 14), moving so as to change the volume of the compartments (12, 14). There is an outlet (121) on the upper part of the sugar dosing compartment (12). The main compartment (11) is embodied in a pipe form. The drive motor (142), belonging to the drive mechanism (141) and driving the sugar pushing head (13), is provided at the bottom part of the drive mechanism compartment (14). There is a movement transfer piece (145) which is in contact with the sugar pushing head (13), and the movement transfer piece (145) comprises a nut holder (146) part, a lateral plate (148) vertical with respect to the nut holder (146) part, and a shaft opening (147) provided on the upper part of the nut holder (146). The screwed shaft (143) is passing through said shaft opening (147) and the nut (144) is positioned to the axis of the screwed shaft (143). The nut (144) is placed to the nut holder (146) part of the movement transfer piece (145). Moreover, the nut (144) is fixed to the sugar pushing head (13) by means of the movement transfer piece (145). In the drive mechanism (141), a bottom level sensor (151) is positioned and at the top part, a top level sensor (150) is positioned and there is a movable piston level arm (149) fixed on the lateral plate (148) in between. The piston level arm (149) is moving together with the movement transfer piece (145).

Figure 5:
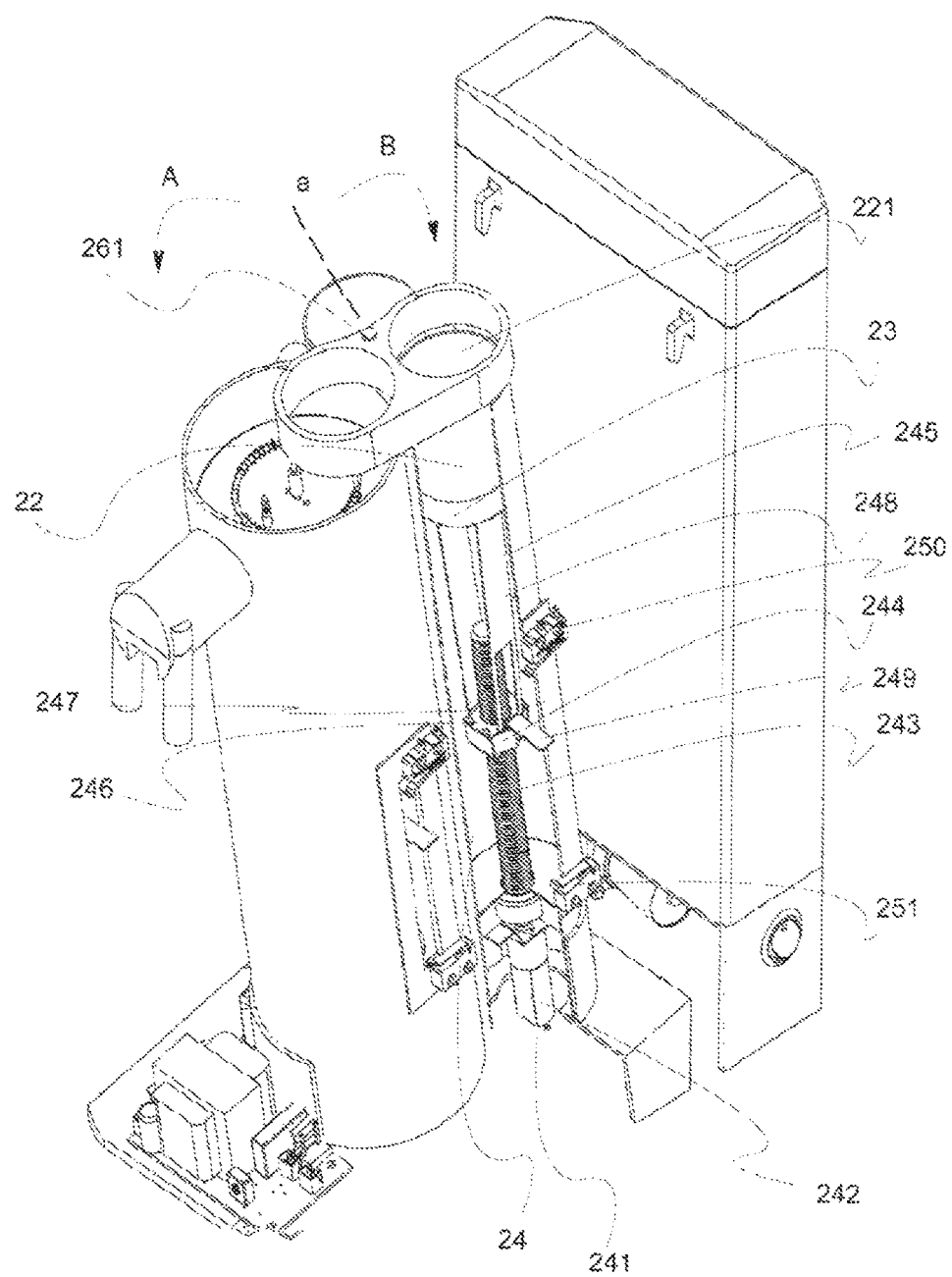
In FIG. 5, a perspective view of the application of the coffee dosing system of the subject matter Turkish coffee cooking and serving machine is given.

With reference to FIGS. 3 and 5, the coffee dosing system (20) has the same structural details as the sugar dosing system (10). Inside a main compartment (21), there is a coffee dosing compartment (22) wherein the Turkish coffee amount is adjusted; a drive mechanism compartment (24) wherein the drive mechanism (241) is existing providing adjustment of the amount of Turkish coffee inside the coffee dosing compartment (22); and a coffee pushing head (23) moving between the compartments (22, 24) so as to change the volume of the compartments (22, 24). There is an outlet (221) at the upper part of the coffee dosing compartment (22). The main compartment (21) is embodied in pipe form. The drive motor (242) belonging the drive mechanism (241) and driving the coffee pushing head (23) is provided at the bottom part of the drive mechanism compartment (24). A movement transfer piece (245) which is in contact to the coffee pushing head (23) is positioned, and there is the movement transfer piece (245), a nut holder (246) part, a lateral plate (248) which is vertical with respect to the nut holder (246) part, and a shaft opening (247) provided on the upper part of the nut holder (246). The screwed shaft (243) is passing through said shaft opening (247) and the nut (244) is positioned to the axis of the screwed shaft (243). The nut (244) is placed to the nut holder (246) part of the movement transfer piece (245). Moreover, the nut (244) is fixed to the coffee pushing head (23) by means of the movement transfer piece (245). In the drive mechanism (241), a bottom level sensor (251) is positioned and in the upper part thereof, a top level sensor (250) is positioned and there is a movable piston level arm (249) in between. The piston level arm (249) is moving in a connected manner with the movement transfer piece (245).

With reference to FIG. 3, the transfer system (26) comprises a dosing piece (261) having a sugar division (262) wherein the sugar is stored whose amount is adjusted in the sugar dosing system (10) and having a coffee division (263) wherein the coffee is stored whose amount is adjusted in the coffee dosing system (20) and positioned in an adjacent manner with respect to the sugar division (262). The sugar division (262) is facing the outlet (121) of the sugar dosing compartment (12); and the coffee division (263) is facing the outlet (221) of the coffee dosing compartment (22). The dosing piece (261) is positioned in the same alignment with the compartments (12, 22) vertically so as to be able to rotate around an assembly axis (a) to the upper part of the sugar dosing compartment (12) and of the coffee dosing compartment (22) and the dosing piece (261) rotates in direction A around the assembly axis (a) and in direction B at the opposite of direction A. In order to provide rotation of the dosing piece (261) around the assembly axis (a), a transfer drive motor (264) is positioned at the bottom part of the compartments (12, 22) and a transfer drive shaft (265) is positioned connected to the transfer drive motor (264).

Figure 6A:
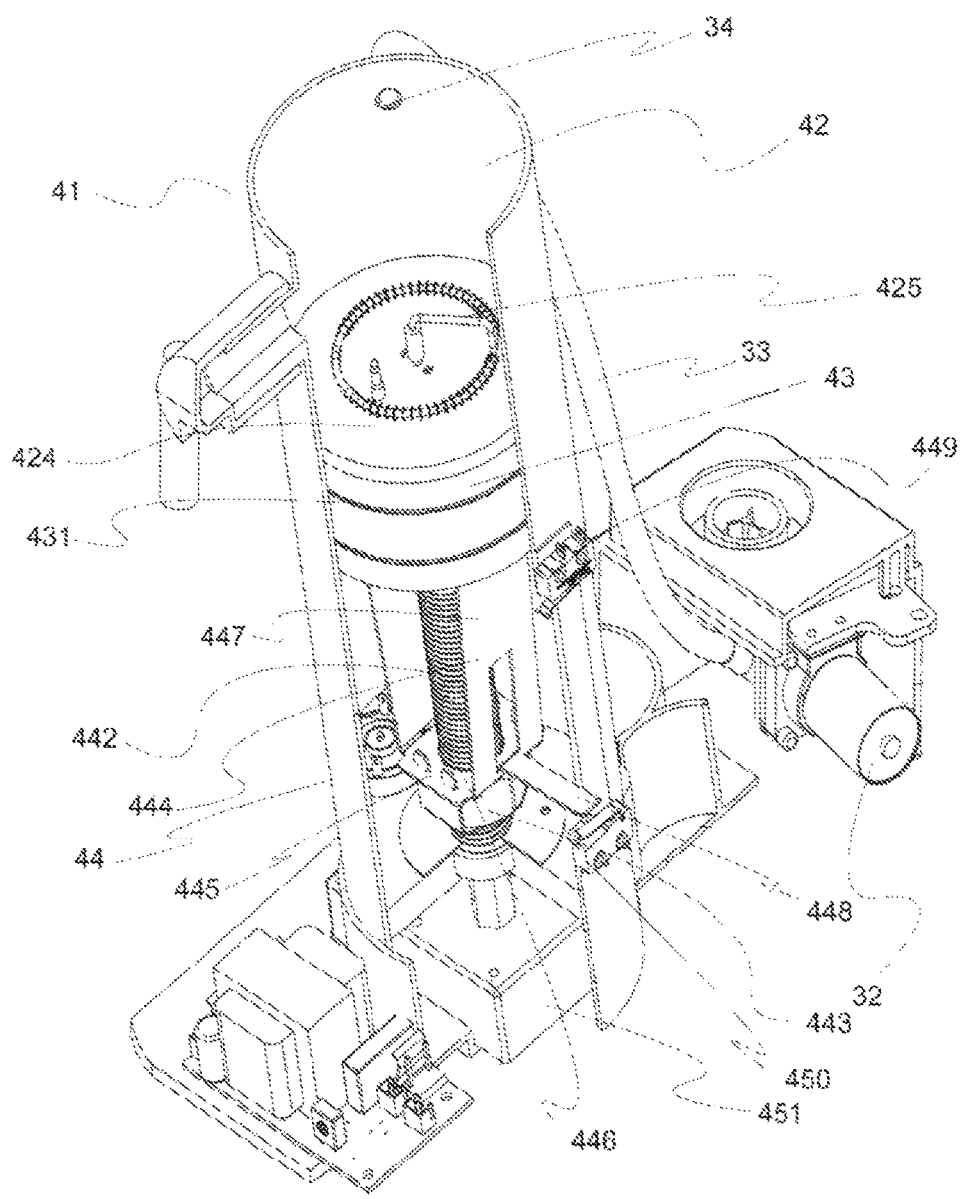
In FIG. 6a, a perspective view of the cooking and serving system of the subject matter Turkish coffee cooking and serving machine is given.

With reference to FIG. 6a, the water transfer system (30) comprises a water depot (31) wherein the water required for cooking coffee is stored; a water pump (32) positioned at a vicinity of the water depot (31); a water pipe (33) positioned between the water pump (32) and the cooking compartment (42); and a water outlet (34) providing water to be transferred from the water pipe (33) to the cooking compartment (42).

Figure 6B:
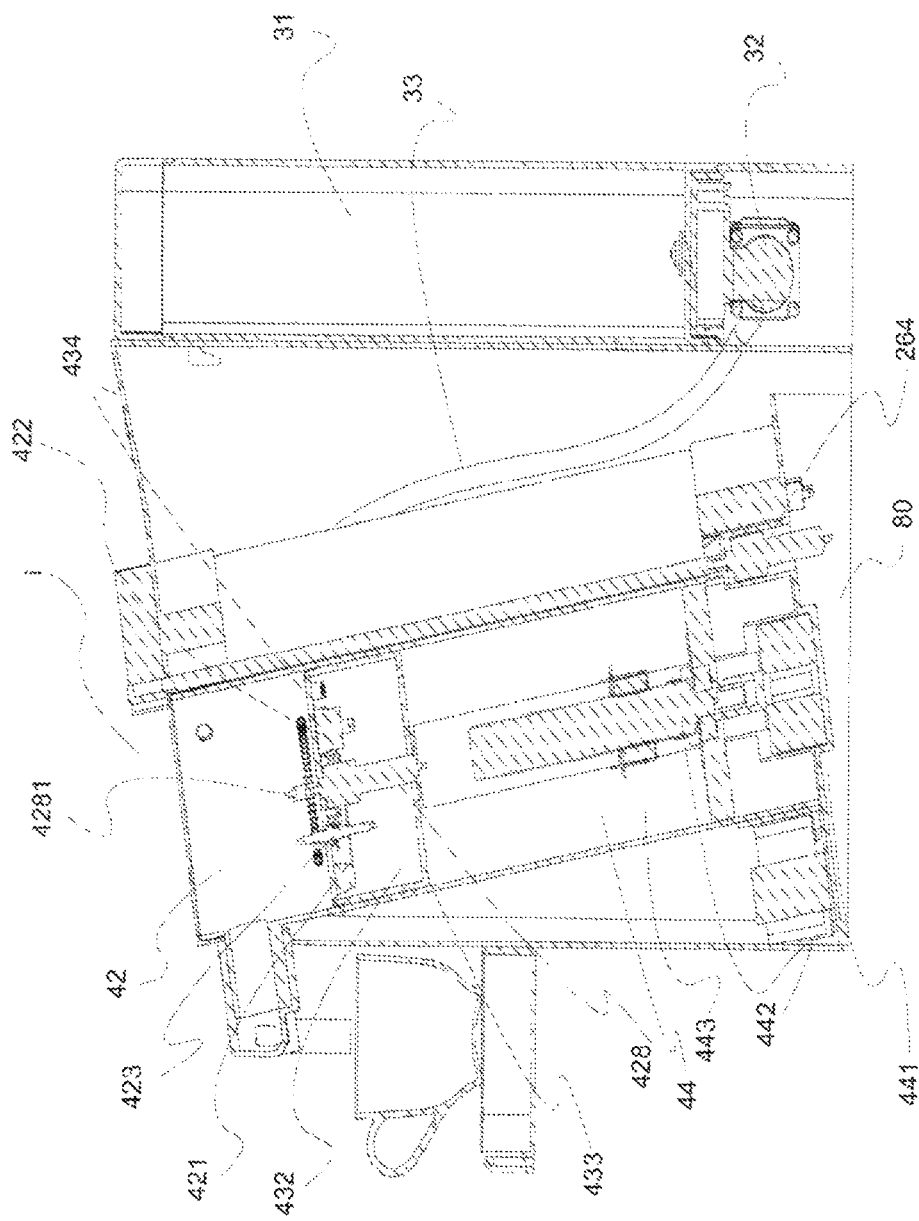

In FIGS. 6a, 6b and 6c, the cooking and serving system (40) comprises a sugar dosing compartment (12) and a main compartment (41) positioned on the front side of the coffee dosing compartment (22). The main compartment (41) is positioned on an inclined base plate (80) such that the coffee mixture is poured into the cup with the help of gravitational force. In another application of the present invention, the main compartment (41) can be placed on a flat base plate. In this case, the material of the cooking compartment (42) is selected as teflon material. Thus, after the coffee mixture is poured to the cup, there remains no coffee mixture in the cooking compartment (42). Inside the main compartment (41), a cooking compartment (42) is positioned at the top, a drive mechanism compartment (44) is positioned having a drive mechanism (441) providing movement of the coffee mixture inside the cooking compartment (42); and a pushing head (43) is positioned having a movement so as to change the volume of the cooking compartment (42) and of the drive mechanism compartment (44). The pushing head (43) divides the main compartment (41) such that there is the cooking compartment (42) and there is the drive mechanism compartment (44). In the cooking and serving system (40), there are two discharge spouts (429) so as to provide discharge of the coffee mixture from the cooking compartment (42) to the cup. The pushing head (43) defines the base of the cooking compartment (42) and it is in connection to a heater (421). The pushing head (43) comprises a cylindrical body (433) having an inner gap (432) and which is in open-top form, and a top cover (434) covering the surface of the cylindrical body (433) and which has a thermally conducting structure and whereon the heater (421) is positioned. There is at least one gasket (431) between the layers of the pushing head (43) for providing sealing between the pushing head (43) and the main compartment (41). The gasket (431) is fixed to the cylindrical body (433) by means of at least one gasket housing (4331). A mixing unit (424) is positioned on the top cover (434), and a mixing unit motor (428) is positioned in the inner gap (432) under the heater (421). The mixing unit motor (428) is assembled to the top cover (434) and to the heater (421) so as to extend in the inner gap (432) of the pushing head (43). A motor shaft (4281) is positioned on the mixing unit motor (428) and the mixing unit (424) comprises a mixing arm (425) connected to the motor shaft (4281). The mixing unit (424) is a one-piece unit and the mixing unit (424) comprises an annular piece (427) positioned on the side of the top cover (434) facing the cooking compartment (42) and a spring (426) disposed on said annular piece (427). The mixing arm (425) is embodied in inverse u form, and one end thereof is connected to the motor shaft (4281) and the other end thereof is connected to the annular piece (427). The heater (421) comprises a temperature detector (423) positioned so as to extend to the cooking compartment (42) on the top cover (434) and a bi-metal thermic unit (422) provided at a vicinity thereof on the side of the top cover (434) facing the inner gap (432). In general, the heater (421) and the top cover (434) are obtained together.

The drive motor (451), belonging to the drive mechanism (441) and driving the pushing head (43), is provided on the bottom part of the drive mechanism compartment (44). A movement transfer piece (444) is provided which is in contact to the pushing head (43) and the movement transfer piece (444) comprises a nut holder (445) part, a lateral plate (447) vertical with respect to the nut holder (445) and a shaft opening (446) provided on the top part of the nut holder (445). The screwed shaft (442) is passing through said shaft opening (446) and the nut (443) is positioned to the axis of the screwed shaft (442). A nut (443) is placed to the nut holder (445) part of the movement transfer piece (444).

Moreover, the nut (443) is fixed to the pushing head (43) by means of the movement transfer piece (444). In the drive mechanism (441), a bottom level sensor (450) is positioned and at the upper part thereof, a top level sensor (449) is positioned and there is a movable piston level arm (448) in between. The piston level arm (448) is moving in a connected manner to the movement transfer piece (444).

Figure 8:
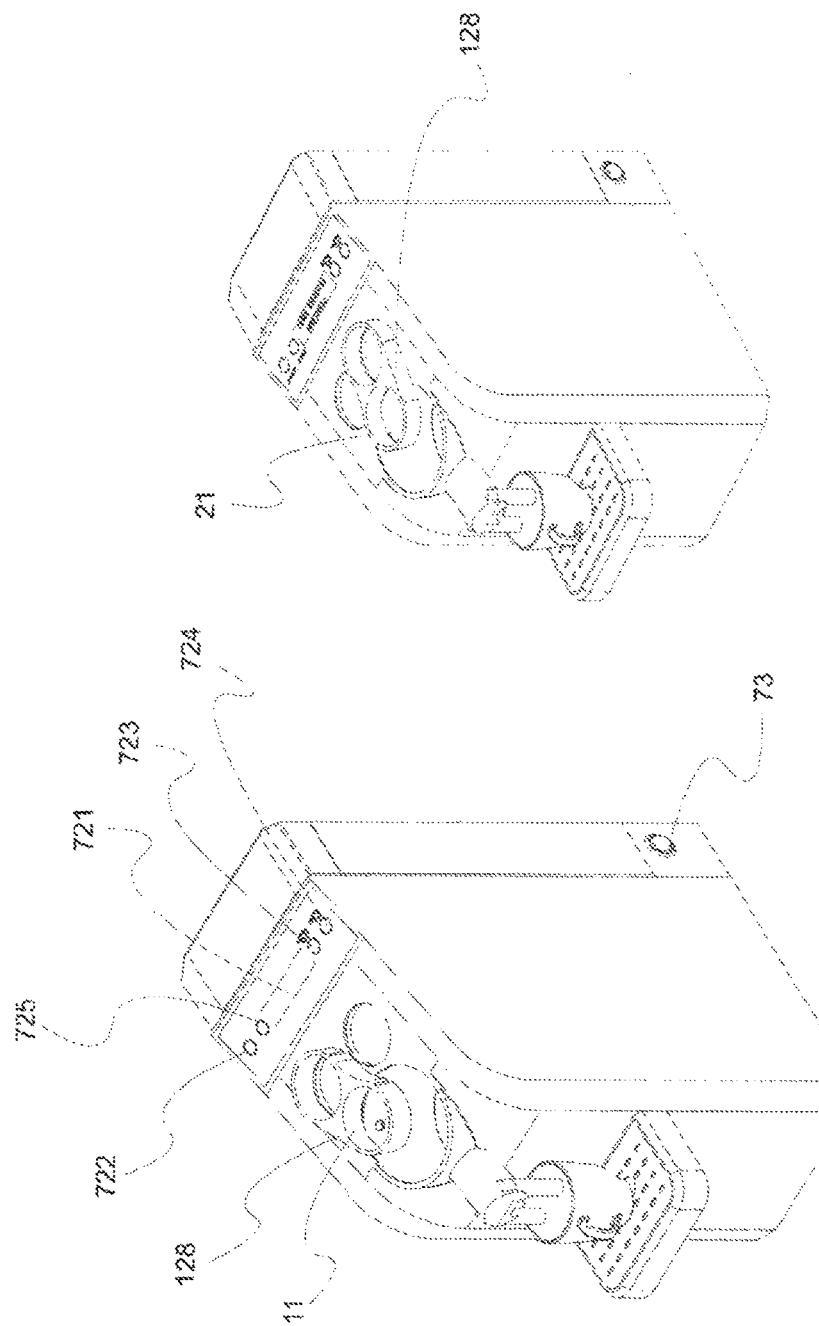
In FIG. 8, a view of the operation of sugar transfer and coffee dosing system of the subject matter Turkish coffee cooking and serving machine is given.

With reference to FIG. 8, the service base (60) positioned on the front side of the main casing (1) is movable, and by means of this, cups with different dimensions can be utilized. The service base (60) is moved manually, however, in an alternative embodiment, the movement thereof can be provided with the help of a motor. With reference to FIGS. 6b and 6c, the position where the coffee mixture is cooked is the cooking position (i), and the position where the cooked coffee mixture is poured to the cup is the discharge position (ii). The cooking position (i) comprises a top cooking position (not illustrated in the figure) where a cup of coffee mixture is cooked and at least one bottom cooking position (not illustrated in the figure) where multiple cups of coffee mixture is cooked.

The control system (70) comprises a control unit (71); a key pad (72) provided on the front upper side of the Turkish coffee cooking and serving machine; and a turn on/turn off button (73) provided on the lateral bottom corner. On the key pad (72), cleaning button (725) and a sugar adjustment button (722) is provided on the lateral side of an LCD screen (721). Moreover, on the key pad (72), there is a single cup button (723) and double cup button (724). In the preferred application, electronic control unit is utilized as the control unit (71).

Under the light of the structural details given above, the usage of the Turkish coffee cooking and serving machine is as follows. First of all, when desired, cleaning process is realized by means of the cleaning button (725) in the cooking compartment (42) prior to the Turkish coffee making process. Water is sent from the water depot (31) to the cooking compartment (42) and the walls of the cooking compartment (42) and the cooking compartment (42) are cleaned as a result of the vertical movement of the pushing head (43). As a result of the vertical movement of the piston level arm (448) and as the piston level arm (448) presses on the top level sensor (449), the cooking compartment (42) arrives at the top position and can be cleaned manually when desired. The desired sugar proportion is selected by utilizing the sugar adjustment button (722). In order to determine the number of cups of Turkish coffee desired to be prepared, single cup button (723) or double cup button (724) is utilized. By means of the LCD screen (721) provided on key pad (72), the number of cups of Turkish coffee to be made and the amount of sugar in the coffee mixture can be monitored.

With reference to FIGS. 4 and 8, the sugar dosing system (10) is functioning for transferring sugar to the cooking compartment (42). The drive motor (142) begins functioning for dosing the amount of sugar determined and selected beforehand according to the information received from the control unit (71). The drive motor (142) provides circular movement to the screwed shaft (143) positioned thereon and the screwed shaft (143) rotates in a circular manner. Circular movement is transformed into linear movement by the nut (144). The nut (144) and the movement transfer piece (145) connected to the nut (144) are moving upwardly. By means of this, the sugar pushing head (13) is also pushed upwardly and the upward movement of the sugar pushing head (13) moves the sugar inside the sugar dosing compartment (12) upwardly and stores the sugar in the sugar division (262).

The piston level arm (149) is moving in a one piece manner together with the movement transfer piece (145). When the sugar is stored in the sugar division (262), the drive motor (142) is stopped by the control unit (71). After the sugar is stored in the sugar division (262), the drive motor (142) begins functioning in the opposite direction according to the movement providing upward movement of the pushing head (13). Thus, the pushing head (13) returns to the prior position thereof and the power of the drive motor (142) is interrupted by the control unit (71). When the piston level arm (149) presses to the top level sensor (150), this shows that sugar in the sugar dosing compartment (12) is finished. As the piston level arm (149) presses the bottom level sensor (151), this shows that the sugar dosing compartment (12) is ready for putting sugar therein.

After the sugar is stored in the sugar division (262) at the desired amount, the transfer drive motor (264) of the transfer system (26) is moving and the transfer drive shaft (265) begins rotating in a circular manner. As a result of the circular movement of the transfer drive shaft (265), the dosing piece (261) begins rotating in direction A around the assembly axis (a) and when the sugar division (262) corresponds to the top of the cooking compartment (42), it stops. In said position, the sugar inside the sugar division (262) is falling into the cooking compartment (42) by means of the gravitational force. After the transfer of the sugar to the cooking compartment (42) is completed, the transfer drive motor (264) is operated in the opposite direction and the dosing piece (261) is rotating in direction B which is opposite to direction A around the assembly axis (a) and it returns to the previous position thereof and the control unit (71) stops the transfer drive motor (264) by interrupting the power thereof.

With reference to FIGS. 5 and 8, after sugar is transferred to the cooking compartment (42), Turkish coffee is transferred. The coffee dosing system (20) is functioning for the Turkish coffee to be transferred to the cooking compartment (42). The drive motor (242) begins functioning according to the information obtained from the control unit (71), in order to dose the amount of Turkish coffee determined and selected beforehand. The drive motor (242) provides a circular movement to the screwed shaft (243) positioned thereon and the screwed shaft (243) is rotating in a circular manner. The circular movement is transformed into linear movement by the nut (244). The nut (244) and the movement transfer piece (245) connected to the nut (244) are moving upwardly. By means of this, the coffee pushing head (23) is also pushed upwardly, and the upward movement of the coffee pushing head (23) is moving the Turkish coffee in the coffee dosing compartment (22) upwardly in order to store the Turkish coffee in the coffee division (263). Together with the movement transfer piece (245), the piston level arm (249) is beginning movement in a one-piece form. When the Turkish coffee is stored in the coffee division (263), the drive motor (242) is stopped by the control unit (71). After the Turkish coffee is stored in the coffee division (263), the drive motor (242) begins functioning in a direction opposite to the movement providing upward movement of the coffee pushing head (23). Thus, the coffee pushing head (23) returns to the prior position thereof again and the power of the drive motor (242) is interrupted by the control unit (71). When the piston level arm (249) presses on the upper level sensor (250), this shows that the Turkish coffee in the coffee dosing compartment (22) is finished. As the piston level arm (249) presses on the bottom level sensor (251), this shows that the coffee dosing compartment (22) has become ready for placing Turkish coffee.

After the Turkish coffee is stored in the coffee division (263) at the desired proportion, the transfer drive motor (264) is moving and the transfer drive shaft (265) begins rotating in a circular manner. As a result of the circular movement of the transfer drive shaft (265), the dosing piece (261) is beginning rotating in direction B around the assembly axis (a) and the coffee division (263) is stopping when it arrives just above the cooking compartment (42). In said position, the Turkish coffee in the coffee division (263) falls into the cooking compartment (42) by means of the gravitational force. After the Turkish coffee is transferred to the cooking compartment (42), the transfer drive motor (264) is operated in the opposite direction, and the dosing piece (263) returns to the prior position by rotating in direction A which is opposite to the direction B around the assembly axis (a) and the control unit (71) stops the transfer drive motor (264) by interrupting the power thereof.

With reference to FIG. 6a, after the transfer of the Turkish coffee to the cooking compartment (42) is completed, water is transferred into the cooking compartment (42) depending on the predetermined cup number. The water pump (32) begins functioning as a result of the information received by the control unit (71). The water, existing inside the water depot (31), is pumped to the water pipe (33) by means of the water pump (32) and it is transferred to the cooking compartment (42) through the water outlet (34) by means of water pipe (33).

With reference to FIGS. 6a and 6b, the cooking process is beginning after the Turkish coffee, sugar and water are transferred to the cooking compartment (42). For the cooking process, the control unit (71) gives command to the heater (421) and provides functioning thereof. The temperature of the coffee mixture started to be cooked by the heater (421) is measured by the temperature detector (423). The measured temperature information is sent to the control unit (71) and the control unit (71) interrupts the power of the heater (421) when the temperature, required for cooking the coffee mixture, is reached. The bi-metal thermic unit (422) provides the heater (421) to be protected against overheating. The power control is decreasing in the heating step in the cooking process. Power control is firstly controlled by the relay and afterwards by the thyristor and finally by the final switching. The coffee mixture subject to the cooking process is mixed within predetermined intervals after a certain temperature. The mixing motor (428) transfers the movement to the motor shaft (4281) in order to provide movement to the mixing arm (425) positioned on the pushing head (43) and in order to provide movement to the annular piece (427) connected to the mixing arm (425) from one end. The annular piece (427) and the mixing arm (425), connected to the motor shaft (4281) from one end are beginning rotation. The spring (426), disposed onto the annular piece (427), increase the efficiency of the mixing process. Thus, the coffee mixture, comprising Turkish coffee, sugar and water, become homogeneous inside the cooking compartment (42). Moreover, the temperature of the coffee mixture inside the cooking compartment (42) becomes homogeneous. Said mixing and cooking process is realized in the cooking position (i). When the cleaning button (725) provided on the key pad (72) is pressed for certain time duration, the temperatures adjusted according to predetermined parameters are displayed on the LCD screen (721). The temperature adjustment is realized by utilizing single cup button (723) and the double cup button (724). Resistance is utilized as the heater (421); however, in the alternative embodiments of the present invention, heater (421) types like induction heater, gas heater can be used instead of resistance.

With reference to FIGS. 6b and 6c, in order to transfer the cooked coffee mixture into the cup, first of all, when the temperature of the coffee mixture reaches a predetermined level, depending on the power received from the control unit (71), the drive motor (451) begins functioning in order to provide the pushing head (43) to advance from the cooking position (i) to the discharge position (ii). The drive motor (451) provides a circular movement to the screwed shaft (442) positioned thereon and the screwed shaft (442) is also rotating in a circular manner. As in the sugar dosing system (10) and in the coffee dosing system (20), the circular movement is transformed into linear movement by the nut (443). The nut (443) and the movement transfer piece (444), connected to the nut (443), are moving upwardly. By means of this, the pushing head (43) is pushed upwardly and the upward movement of the pushing head (43) is moving the coffee mixture in the cooking compartment (42) upwardly. The coffee mixture is rising up to the discharge spout (429) and flows into the cup positioned on the service base (60). Since the coffee mixture subject to the cooking process begins rising, first of all, the foam of the coffee mixture is poured into the cup through the discharge spout (429). Thus, foam loss is prevented. Since the pushing head is inclined as a result of the inclined form of the base plate (80), said process is facilitated. As the cooking compartment (42) is arriving at the discharge position (ii), the drive motor (451) is stopped by the control unit (71). Since the cup and the service base (61) are positioned under the discharge spout (429) and since the coffee mixture is arriving at the discharge spout (429) directly from the cooking compartment (42), the coffee mixture is prevented from pouring to the outer environment.

After the coffee mixture is completely discharged to the cup, the drive motor (451) begins functioning in the opposite direction with respect to the movement providing the upward movement of the pushing head (43). Thus, the pushing head (43) returns to the cooking position (i) back again. In this case, the power of the drive motor (451) is interrupted by the control unit (71). The piston level arm (448) presses the bottom level sensor (450), and this shows that the cooking and serving system (40) is in a ready position for cooking and serving the coffee mixture. While the coffee mixture is being discharged to the cup, two short-duration mixing processes are applied, thus the coffee mixture is discharged completely from the cooking compartment (42) and there remains no foam in the cooking compartment (42) and the walls of the cooking compartment (42) are also cleaned. One of the members affecting the cleaning process is the vertical movement of the pushing head (43).

Figure 7:
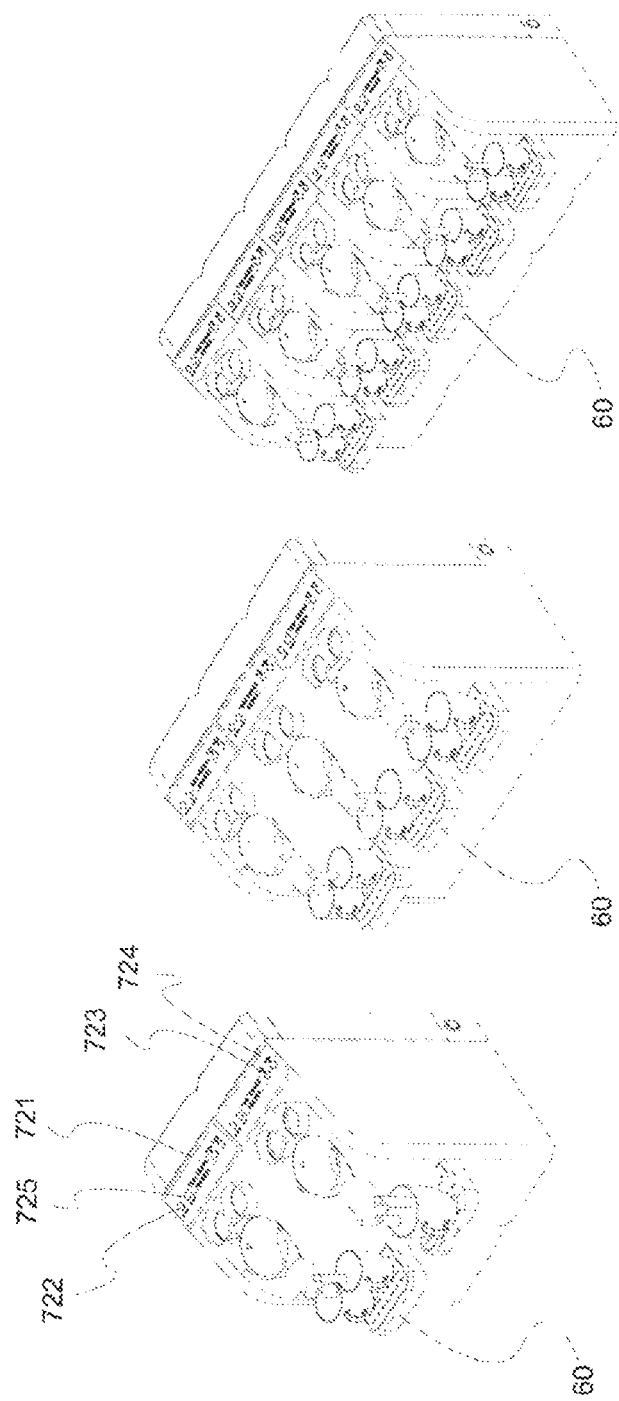
In FIG. 7, the view of the other preferred applications of the subject matter Turkish coffee cooking and serving machine is given.

Since the service base (60) comprises holes, in case of any overflow from the cup, the overflowing coffee mixture can be held on the service base (60) and does not flow to the outer environment. With reference to FIG. 7, if single cup of coffee mixture is to be served, the cup is placed such that the two discharge spouts (429) are existing inside the cup, and if a couple of cups are to be utilized, the two discharge spouts (429) discharge the coffee mixture into the two cups separately.

In an alternative embodiment of the present invention, the Turkish coffee, the sugar and the water can be put manually into the cooking compartment (42). With reference to FIG. 7, pluralities of Turkish coffee cooking and serving machines can be placed side by side, and a Turkish coffee cooking and serving system can be formed and Turkish coffee can be served to pluralities of cups. Moreover, instead of the drive mechanism (141) provided in the sugar dosing system (10), instead of the drive mechanism (241) of the coffee dosing system (20) and instead of the drive mechanism (441) provided in the cooking and serving system (40), pneumatic, hydraulic and electrical pistons can be utilized. The movement can also be provided manually by man power.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A Turkish coffee cooking and serving machine comprising:
   a cooking compartment whose inner volume is heated by a heater and wherein a coffee mixture including Turkish coffee, water and optionally sugar is cooked; and when cooking process is completed, providing transfer of the cooked coffee mixture in the cooking compartment through a discharge spout to a beverage receptacle for serving the cooked coffee to people;
   a pushing head moving vertically between a cooking position and a discharge position where the coffee mixture in the cooking compartment is raised to the same level as the discharge spout, where the pushing head defines the base of the cooking compartment; a drive mechanism moving the pushing head between the cooking position and the discharge position; a control unit controlling the drive mechanism;
   a coffee dosing compartment wherein the Turkish coffee, to be transferred to the cooking compartment, is stored and where the amount of said Turkish coffee is adjusted; a vertically moving coffee pushing head defining the base of the coffee dosing compartment; a drive mechanism moving the coffee pushing head vertically.

2. The Turkish coffee cooking and serving machine according to claim 1, comprising a sugar dosing compartment wherein the sugar to be transferred to the cooking compartment is stored and adjusting the amount of sugar; a sugar pushing head which is vertically movable defining a base of the sugar dosing compartment; a drive mechanism moving the sugar pushing head in the vertical direction.

3. The Turkish coffee cooking and serving machine according to claim 2, wherein the drive mechanism comprises a drive motor for providing the movement of the sugar pushing head; a screwed shaft receiving the movement provided by the drive motor; a nut moving on the screwed shaft and transforming the circular movement of the screwed shaft to linear movement; and a movement transfer piece configured so as to transfer the vertical movement of the nut to the sugar pushing head.

4. The Turkish coffee cooking and serving machine according to claim 3, wherein the movement transfer piece comprises a nut holder part wherein the nut is placed; a shaft opening provided on the upper part of the nut holder and configured such that the screwed shaft will pass through; and at least one lateral plate connected to the sugar pushing head.

5. The Turkish coffee cooking and serving machine according to claim 3, wherein the drive mechanism comprises a top level sensor sensing that the sugar in the sugar dosing compartment is completely finished; a bottom level sensor sensing that the sugar dosing compartment is in a condition where sugar can be put; and a piston level arm moving together with the movement transfer piece between the sensors so as to contact the sensors.

6. The Turkish coffee cooking and serving machine according to claim 1, wherein the drive mechanism comprises a drive motor for providing the movement of the coffee pushing head; a screwed shaft receiving the movement provided by the drive motor; a nut moving on the screwed shaft and transforming the circular movement of the screwed shaft to linear movement; and a movement transfer piece configured so as to transfer the vertical movement of the nut to the coffee pushing head.

7. The Turkish coffee cooking and serving machine according to claim 6, wherein the movement transfer piece comprises a nut holder part wherein the nut is placed; a shaft opening provided on the upper part of the nut holder and configured such that the screwed shaft will pass through; and at least one lateral plate connected to the coffee pushing head.

8. The Turkish coffee cooking and serving machine according to claim 6, wherein the drive mechanism comprises a top level sensor sensing that the coffee in the coffee dosing compartment is completely finished; a bottom level sensor sensing that the coffee dosing compartment is in a condition where coffee can be put; and a piston level arm moving together with the movement transfer piece between the sensors (so as to contact the sensors.

9. The Turkish coffee cooking and serving machine according to claim 8 comprising a dosing piece assembled to the upper part of the dosing compartments so as to rotate around an assembly axis and rotating in direction A and transferring the sugar raised to the own alignment by the sugar pushing head in the sugar dosing compartment and rotating in direction B which is opposite to direction A and transferring the Turkish coffee, raised to the own alignment by the coffee pushing head in the coffee dosing compartment, to the cooking compartment; and a transfer drive motor connected to the dosing piece so as to provide rotation movement in said two directions (A, B).

10. The Turkish coffee cooking and serving machine according to claim 9, wherein the dosing piece comprises a sugar division facing the outlet of the sugar dosing compartment and wherein the sugar to be transferred to the cooking compartment is accumulated; and a coffee division facing the outlet of the coffee dosing compartment and wherein the Turkish coffee to be transferred to the cooking compartment is accumulated.

11. The Turkish coffee cooking and serving machine according to claim 10 comprising a cleaning button utilized for starting the cleaning process by means of the water transferred from a water depot of the cooking compartment; a sugar adjustment button provided at a vicinity of the cleaning button and providing sugar proportion selection; at least one cup button providing determination of the number of beverage receptacles the Turkish coffee will be served thereto; and an LCD screen displaying the adjustments.

12. The Turkish coffee cooking and serving machine according to claim 10 wherein in order to adjust the cooking temperature of the coffee mixture, the control unit is configured such that the temperatures, adjusted according to the predetermined parameters, will be displayed on the LCD screen in case the cleaning button is pressed for certain time duration.

* * * * *